United States Patent
Altman et al.

(10) Patent No.: US 11,743,056 B2
(45) Date of Patent: Aug. 29, 2023

(54) SYSTEMS AND METHODS FOR SELF-CONTAINED CERTIFICATE SIGNING REQUEST IN DELEGATION SCENARIOS

(71) Applicant: Indeed, Inc., Austin, TX (US)

(72) Inventors: Greg Altman, Seattle, WA (US); Justin Daily, Seattle, WA (US); Sergey Karamov, Redmond, WA (US)

(73) Assignee: INDEED, INC., Austin, TX (US)

( * ) Notice: Subject to any disclaimer, the term of this patent is extended or adjusted under 35 U.S.C. 154(b) by 160 days.

(21) Appl. No.: 17/331,456

(22) Filed: May 26, 2021

(65) Prior Publication Data

US 2023/0216696 A1 Jul. 6, 2023

Related U.S. Application Data

(60) Provisional application No. 63/030,287, filed on May 26, 2020.

(51) Int. Cl.
*H04L 9/32* (2006.01)
*H04L 9/40* (2022.01)

(52) U.S. Cl.
CPC .......... *H04L 9/3268* (2013.01); *H04L 9/3247* (2013.01); *H04L 63/166* (2013.01)

(58) Field of Classification Search
CPC .................................................... H04L 9/3268
See application file for complete search history.

(56) References Cited

U.S. PATENT DOCUMENTS

| | | | |
|---|---|---|---|
| 9,450,764 B1* | 9/2016 | Savant ................. | H04L 9/3268 |
| 11,538,122 B1* | 12/2022 | Rakowicz ........... | H04L 63/0435 |
| 2003/0097566 A1* | 5/2003 | Kumagai ........... | G06Q 20/3821 |
| | | | 713/175 |
| 2007/0094349 A1* | 4/2007 | Rits ........................ | G06F 21/52 |
| | | | 713/176 |

* cited by examiner

*Primary Examiner* — Bradley W Holder
(74) *Attorney, Agent, or Firm* — Young Basile Hanlon & MacFarlane, P.C.

(57) ABSTRACT

A platform security system and method improve security by binding an identity of a self-contained certificate signing request (SC CSR) requestor to the SC CSR to prevent malicious tampering, such as man-in-the-middle attacks. In at least one embodiment, the requestor, such as a client computer system or other source of a request, requests certificates from a certificate authority (CA). Binding the identity of the SC CSR to the requestor can prevent unauthorized system and/or data access and potentially resultant unauthorized access, malicious tampering, such as man-in-the-middle attacks, and other unauthorized actions or observations. Validation can be performed at the CA on the SC CSR to determine the integrity of the requestor and authorization to receive certificates before the CA sends the certificate to the requestor.

20 Claims, 4 Drawing Sheets

SYSTEMS AND METHODS FOR SELF-CONTAINED CERTIFICATE SIGNING REQUEST IN DELEGATION SCENARIOS

CROSS-REFERENCE TO RELATED APPLICATIONS

The present application claims priority to U.S. Provisional Patent Application No. 63/030,287, filed May 26, 2020, entitled "Systems and Methods to Enhance Technology Including Employment and Security Related Technology", which is incorporated herein by reference.

BACKGROUND OF THE DISCLOSURE

Field of the Disclosure

The present invention relates to supervised learning processing, and more particularly to a system, method, and computer program product involving self-contained signing certificate signing requests between requestors, intermediaries, and certificate authorities.

Description of the Related Art

In various communication implementations, in order to provide security between various entities, unique certificates identifying entities are used. Such certificates are particular to each entity. The certificates can be referred to as public certificates and allow other entities to confidently know the identity of specific entities.

For various implementations, an entity referred to as a requestor, requests for a certificate to be issued from a certificate authority or CA. The certificate can be a new certificate or an updated/revised certificate. The request may be in the form of a certificate signing request or CSR. The CSR can be sent directly from the requestor to the CA. In these instances, the CSR is typically implemented as a secure point-to-point transaction between the requestor and the CA. The CA sends the new or updated/revised certificate to the requestor.

In certain cases, there may be a desire to implement a mediator or intermediary between the requestor and the CA. The use of intermediaries may be driven by business scenarios or business logic. For example, an intermediary may be used to provide authorization and deployment to requestors for requesting of certificates. Example implementations can provide for the use of the CA as a facade and providing authorization or added business logic such as an abstraction layer through the intermediary which can allow for seamless CA replacement or redirection. Intermediaries may also support and be specific to different server computers that provide services.

Security concerns arise when the intermediary is not a trusted component/entity. In certain instances, the intermediary can be a third party component/entity that is not in the control of an enterprise that controls the requestor and/or the CA. Because the request or CSR is propagated via the intermediary, the request or CSR can be compromised. The intermediary may modify propagated CSRs or even generate different CSRs to maliciously impersonate different identities. For example, a malicious intermediary may generate its own private key, send a modified or spoofed CSR, under the guise of a requestor, and receive a public certificate from the CA that identifies the requestor. The malicious intermediary using the public certificate is able to impersonate the requestor.

SUMMARY

A method, system and computer-readable medium providing a self-contained certificate signing request (SC CSR) that comprises determining an entity that requires a certificate, wherein the certificate identifies the entity to other entities; binding an identity of a requestor to the SC CSR; sending the SC CSR that is bound with the identity to one or more intermediaries which is passed along to a certificate authority (CA), wherein the CA performs a validation on the SC CSR that is bound with the identity to verify identity and authorization to receive certificates by the requestor; and receiving the certificate from the CA.

BRIEF DESCRIPTION OF THE DRAWINGS

The present disclosure may be better understood, and its numerous objects, features and advantages made apparent to those skilled in the art by referencing the accompanying drawings. The use of the same reference number throughout the several figures designates a like or similar element.

DETAILED DESCRIPTION

A platform security system and method improve security by binding an identity of a self-contained certificate signing request (SC CSR) requestor to the SC CSR to prevent malicious tampering, such as man-in-the-middle attacks. In at least one embodiment, the requestor, such as a client computer system or other source of a request, requests certificates from a certificate authority (CA). Binding the identity of the SC CSR to the requestor can prevent unauthorized system and/or data access and potentially resultant unauthorized access, malicious tampering, such as man-in-the-middle attacks, and other unauthorized actions or observations. In certain implementations, the binding of the identity to the requestor with the SC CSR is through a "current" private key (PK) that is owned by the requestor. The SC CSR is passed from the requestor through one or more intermediaries before the CA receives the SC CSR. The one or more intermediaries are not able to modify or tamper with the SC CSR, because the SC CSR is bound to the identity of the requestor through the current PK. Implementations provide for the CA to include a component (e.g., plugin) that validates the SC CSR.

Figure 1:
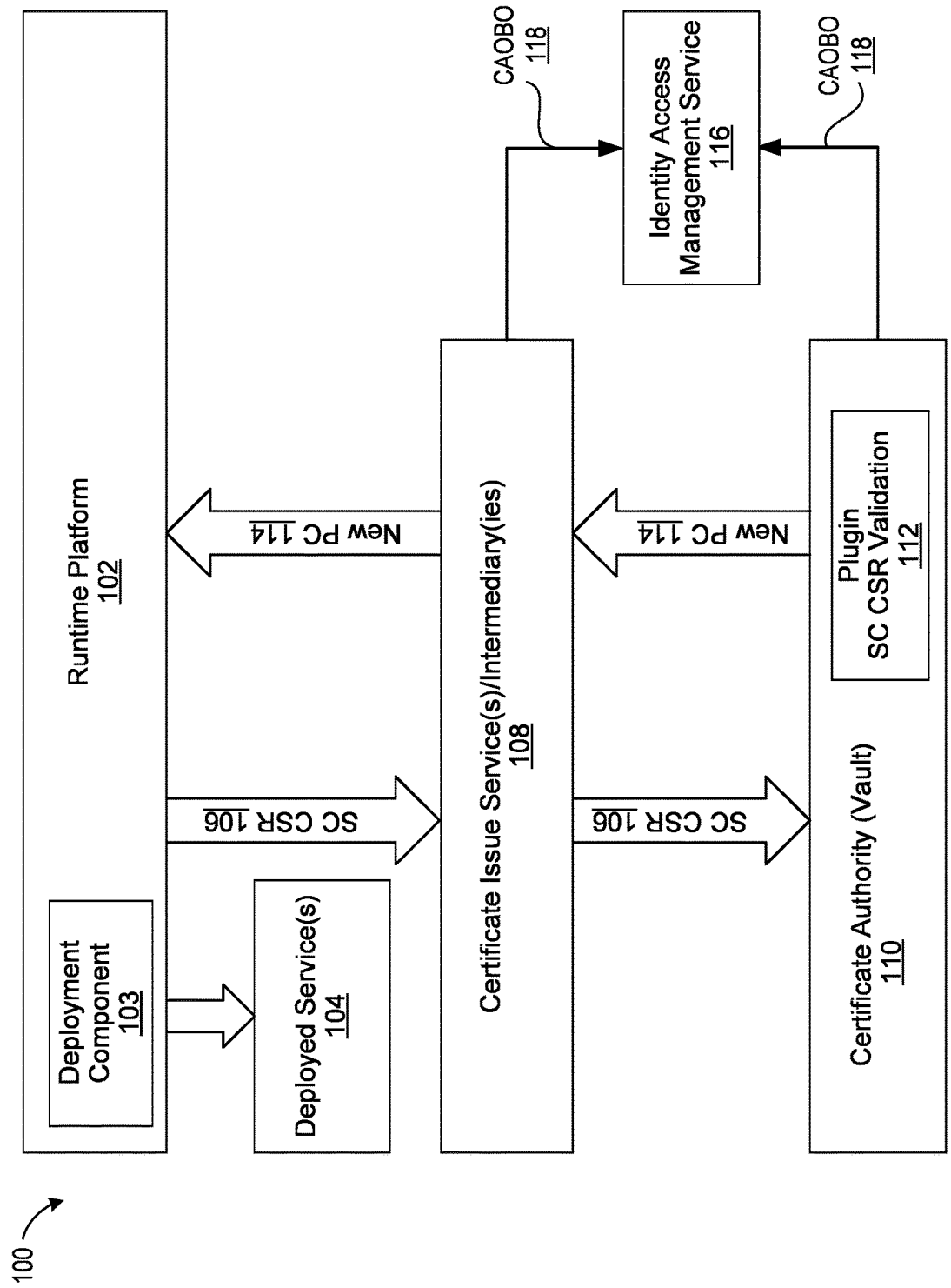
FIG. 1 depicts a simplified block diagram of platform security system that implements self-contained certificate signing requests between requestors, intermediaries, and certificate authorities.

FIG. 1 shows an example platform security system that implements self-contained certificate signing requests between requestors, intermediaries, and certificate authorities. The system 100 can be part of a or accessible to other systems, such as a service mesh. In various implementations the system 100 is used for deployment of services. Implementations provide for runtime platform 102 to deploy one or more service(s) or deployed service(s) 104. The runtime platform 102 may include a deployment component 103 that deploys deployed service(s) 104.

Embodiments can provide for the runtime platform 102 and the deployed service(s) to have particular unique identities. Implementations provide for the certificates to be used for the unique identities. In particular, such certificates are public certificates or PC, that are recognized by other entities.

In various implementations, runtime platform 102 requests for a new or updated certificate or certificates, which are public certificates or PC. The runtime platform 102 may be referred to as a client or requestor. In certain implementations, the runtime platform 102 requests for a new PC for service 104 to be deployed. In other words, when a service 104 is to be deployed, the service 104 will need a PC when the service is 104 is bootstrapped. The deployed service(s) 104 may interact with themselves and/or other entities and use the unique PCs to identify themselves to each other and/or the other entities.

The PC is used to identify service 104. The request for the PC is made before the service 104 is started or deployed. In certain cases, the runtime platform 102 or the deployed service(s) 104 may have expiring PCs which are to be renewed/replaced. Therefore, a request for a new PC is performed. For example, deployed service(s) 104 may be implemented through a service mesh which provides a PC with a short term expiration. The deployed service 104 needs to renew the expiring PC to continue to be operational. Other scenarios that include the use of a PC involve work stations (users) accessing test/production environments through a bridge that requires the PC to validate the work stations (users).

Implementations provide for the runtime platform 102 to include currently in use private key 1 or PrK_1 and current public certificate or PC_1. A self-contained certificate signing request or SC CSR 106 is sent by the runtime platform 102 to request for a PC either for the runtime platform 102 or one or more deployed service(s) 104. A public key 2 or PuK_2 is signed by PrK_1. The SC CSR 106 includes PC_1 and PuK_2. A binding is therefore performed with the identity of the runtime platform 102 which is a requestor through the PrK_1.

One or more certificate issue (CI) services or intermediaries 108 receive the SC CSR 106. In certain implementations, the runtime platform 102 as a sender establishes a transport layer security (TLS) connection with the one or more CI services or intermediaries 108 through the pair of (PrK_1, PC_1). The identity of runtime platform 102 is established with CI services or intermediaries 108 for authentication and authorization. In certain implementations, a JSON Web Token or JWT token can be possessed by runtime platform 102. The JWT token is used for authentication and authorization. In such implementations, the JWT token is signed by a private key of an application such as OneLogin in order to authenticate the platform 102 to the one or more CI services or intermediaries 108.

In implementations that make use of JWT tokens the following can be performed. In instances of first-time certificate or PC generation, using a JWT token of the runtime platform 102 (i.e., JWT bearer token), the same processing pattern described above can used. The JWT token is generated with metadata, that effectively gives the JWT token the property of a PC. Prior to performing a two factor authentication (2FA) with the OneLogin application, the runtime platform 102 can first generate private key, public key pair (PrK_1, PuK_1), where the PuK_1 is included with a request to the OneLogin application. The JWT token will include PuK_1 and the SC CSR 106 will include the JWT with PuK_1 which is used to verify the signature of the public key or PuK_2 that was signed by PrK_1. The JWT token also includes the signature of PuK_2 that was signed by PrK_1.

The use of JWT tokens can lead to an unbounded growth of a certificate or PC size from periodic renewals of the PC, since each renewal of a current PC may be added to the SC CSR 106, and consequently added also to the generated certificate or new PC. To alleviate this potential issue, the JWT token or the current PC is not included in the the body of the SC CSR 106. As long as the SC CSR 106 includes the signature of PuK_2 that was signed by PrK_1, the JWT token or the PC_1 can be sent outside or separate from SC CSR 106.

The intermediaries 108 may or may not be trusted entities. In certain cases, intermediaries 108 can be third party entities that provide a service. The intermediaries 108 are implemented to provide functions that can be related to business scenarios or business logic. For example, particular intermediaries 108 may be used to provide authorization and deployment to requestors for requesting of certificates. In certain implementations, CI services or intermediaries 108 are used to manage computing resources, such server computers. The intermediaries 108 can operate sequential or in parallel. It is to be understood that with multiple CI services or intermediaries 108, operations can also take place at different times or sequences. The one or more intermediaries 108 are not able to modify or tamper with the SC CSR 106, because the SC CSR 106 is bound to the identity of the runtime platform 102 through the PrK_1. The CI services or intermediaries 108 merely pass on the SC CSR 106 to a certificate authority (CA) or vault 110.

The CA (vault) 110 may or may not be a trusted entity. The CA (vault) 110 issues new or replacement PC to a requestor, such as runtime platform 102. Implementations further provide for the he CA (vault) 110 to include a component or plugin for SC CSR validation 112. As discussed, the CI services or intermediaries 108 can be implemented to provide authorization of new/renewed certificates or PCs to the requestors (e.g., runtime platform 102). However, in certain instances, the CI services or intermediaries 108 may not be consistent entities in the processing of such requests. In other words, the CI services or intermediaries 108 may or may not be available to identify and validate the identity and PC request of requestor (e.g., runtime platform 102).

The plugin for SC CSR validation 112 is used to identify that the SC CSR 106 is self-contained and includes proof of identity of the requestor (e.g., runtime platform 102). The plugin for SC CSR validation 112 validates the integrity of the SC CSR 106, and uses the PC_1 to verify the signature of PuK_2 signed by PrK_1 which proves that PrK_2 is owned by the identity in PC_1. The identity being that have the requestor (e.g., runtime platform 102).

If the SC CSR 106 is validated the CA (vault) 110 provides a new or revised PC 114. The new PC 114 can be passed through the one or more CI services or intermediaries 108 to the requestor (e.g., runtime platform 102). In certain implementations, the CI services or intermediaries 108 are bypassed, and the new PC 114 is directly provided to the requestor (e.g., runtime platform 102).

Implementations further provide for the system 100 to include an identity access management (IAM) service 116. The CI services or intermediaries 108 and CA (vault) 110 are provided "can act on behalf of" communication 118 to the IAM service 116. In particular, the IAM service 116 can provide identifiers, such as a source ID from the current/prior PC, and a target ID from the SC CSR 106.

Figure 2:
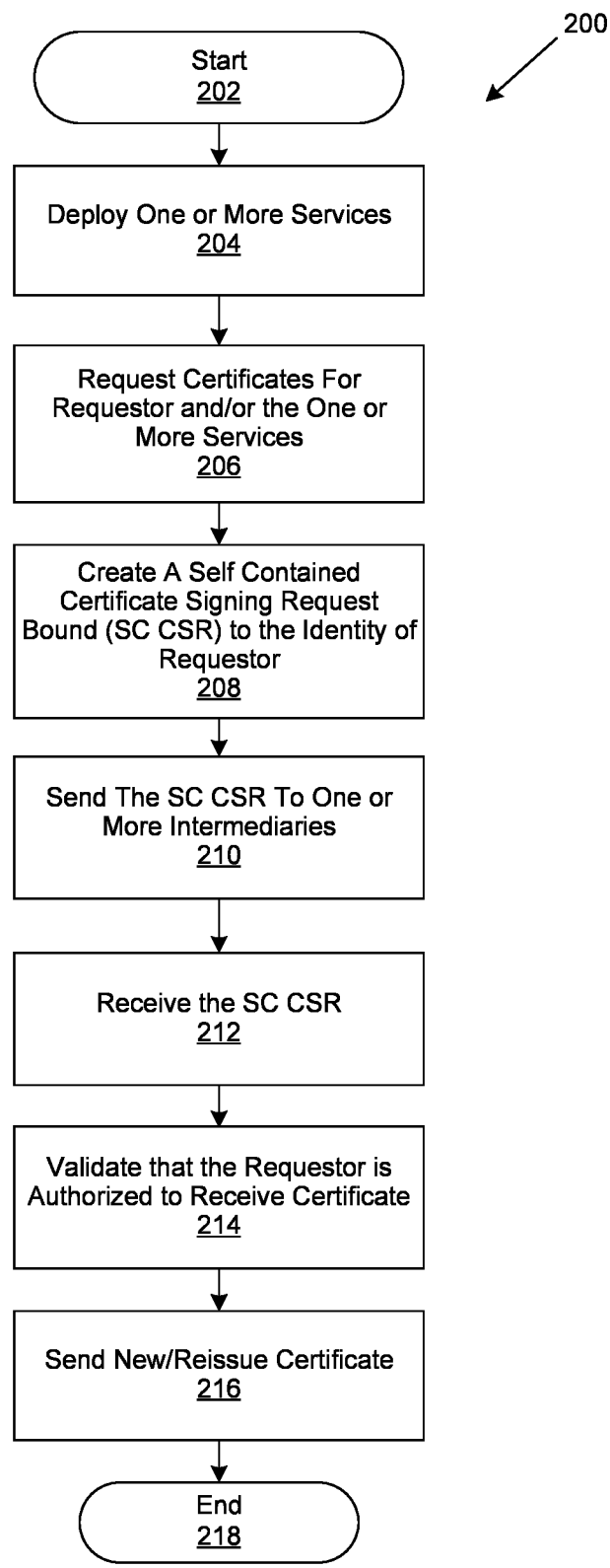
FIG. 2 is a flowchart depicting example operations that may be executed in certain embodiments of the disclosed system for self-contained signing certificate requests between requestors, intermediaries, and certificate authorities.

FIG. 2 depicts an example process 200 for self-contained signing certificate requests between requestors, intermediaries, and certificate authorities.

. At operation 202, the process 200 starts. At operation 204, a requestor, such as runtime platform 102 or deployment component 103 of runtime platform 102 deploys one or more deployed services 104, where the one or more services are entities that are to be identified by other entities.

At operation 206, the runtime platform 102 as a requestor determines and requests new or renewed/updated certificates for itself and/or the one or more deployed services 104. When a deployed service 104 is deployed, a new certificate may be needed during bootstrapping of the deployed service 104. In certain instances, the runtime platform and/or the deployed services 104 may have an expiring certificate that is to be renewed or replaced.

At operation 208, the runtime platform 102 as a requestor creates a self-contained certificate signing request or SC CSR 106. The SC CSR 106 binds the identity of the runtime platform 102 by including, for example, a public key 2 or PuK_2 is signed by a current private key 1 or PrK_1 and including a current public certificate PC_1. In certain implementations when using JSON Web tokens or JWT tokens, a JWT token is used as a public certificate by runtime platform 102. The JWT token will include the current public PuK_1 which is included in the SC CSR 106, and is used to the signature of the public key or PuK_2 that was signed by PrK_1. The JWT token also includes the signature of PuK_2 that was signed by PrK_1.

At operation 210, the runtime platform 102 sends the SC CSR 106 to one or more certificate issue (CI) services or intermediaries 108. In certain implementations, the one or more CI services or intermediaries 108 perform certain functions which may be related to business based scenarios and business logic. In various implementations, the CI services or intermediaries 108 provide certificate authorization and deployment functions. Because the SC CSR 106 is bound to the requestor runtime platform 102, the SC CSR 106 cannot be tampered, spoofed, or changed. The one or more CI services or intermediaries 108 merely passes on the SC CSR 106.

At operation 212, certificate authority or CA (Vault) 110 receives the SC CSR 106 to provide for a new or renewed certificate to runtime platform 102 or the one or more deployed services 104. The validation can be performed by the At operation 214, the CA (Vault) 110 and particularly the plugin for SC CSR validation 112 performs validation that requestor runtime platform 102 is authorized to receive a new or reissued certificate. The plugin for SC CSR validation 112 is used to identify that the SC CSR 106 is self-contained and includes proof of identity of the requestor (e.g., runtime platform 102). The plugin for SC CSR validation 112 validates the integrity of the SC CSR 106, and uses the PC_1 to verify the signature of PuK_2 signed by Prk_1 which proves that PrK_2 is owned by the identity in PC_1. The identity should be runtime platform 102.

At operation 216, if the SC CSR 106 is verified and validated the CA (Vault) 110 sends the new or reissued certificate to the runtime platform 102. In certain implementations, IAM service 116 is provided with a identifiers as to public certificates or PCs. At operation 218, the process 200 ends.

Figure 3:
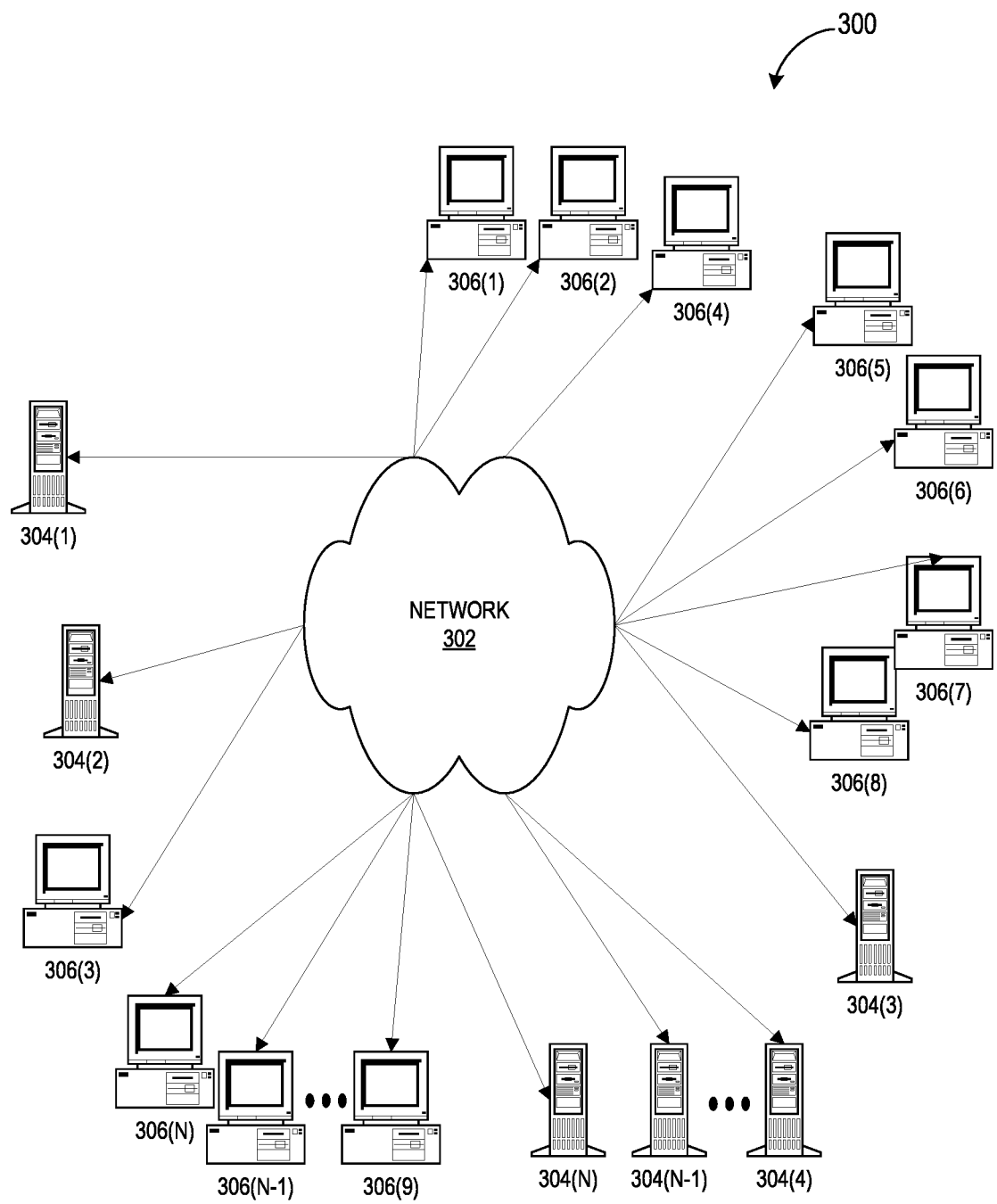
FIG. 3 depicts a network environment in which at least some embodiments of the methods and systems that are disclosed may be practiced.

FIG. 3 depicts an exemplary network environment 300 in which at least some embodiments of the methods and systems described below may be practiced. Network 302 (e.g., a private wide area network (WAN) or the Internet) includes a number of networked server computer systems 304(1)-(N). In certain implementations, the server computer systems 304(1)-(N) are part of one or more enterprise or business entity systems. The server computer systems 304(1)-(N) (also referred to as "server(s) 304(1)-(N)") may be accessible by user computer systems 306(1)-(N) (also referred to as "client(s) 306(1)-(N)") client(s) 306, where N is the number of server computer systems connected to the network, and the value N may be different for the server and user computer systems. Communication between user(s) computer systems 306(1)-(N) and server(s) 304(1)-(N) typically occurs over a network, such as a public switched telephone network over asynchronous digital subscriber line (ADSL) telephone lines or high-bandwidth trunks, for example communications channels providing T1 or OC3 service. Client(s) 306(1)-(N) typically access server(s) 304(1)-(N) through a service provider, such as an internet service provider ("ISP") by executing application specific software, commonly referred to as a browser, on one of client(s) 306(1)-(N).

Server(s) 304(1)-(N) and/or client(s) 306(1)-(N) are programmed to become specialized machines to implement at least some embodiments of the below described systems and methods. The specialized computer systems may, for example, include a mainframe, a mini-computer, a personal computer system including notebook computers, wireless, mobile computing devices (including personal digital assistants, smart phones, and tablet computers), etc. When programmed to implement at least some of the embodiments of the below described systems and methods, the computer systems are specialized machines. These computer systems are typically information handling systems, which are designed to provide computing power to one or more users, either locally or remotely. Such a computer system may also include one or a plurality of input/output ("I/O") devices coupled to the system processor to perform specialized functions. Tangible, non-transitory memories (also referred to as "storage devices") such as hard disks, compact disk ("CD") drives, digital versatile disk ("DVD") drives, and magneto-optical drives may also be provided, either as an integrated or peripheral device. At least some of the embodiments of the below described systems and methods can be implemented using code stored in a tangible, non-transient computer readable medium and executed by one or more processors. At least some of the embodiments of the below described systems and method can be implemented completely in hardware using, for example, logic circuits and other circuits including field programmable gate arrays.

Figure 4:
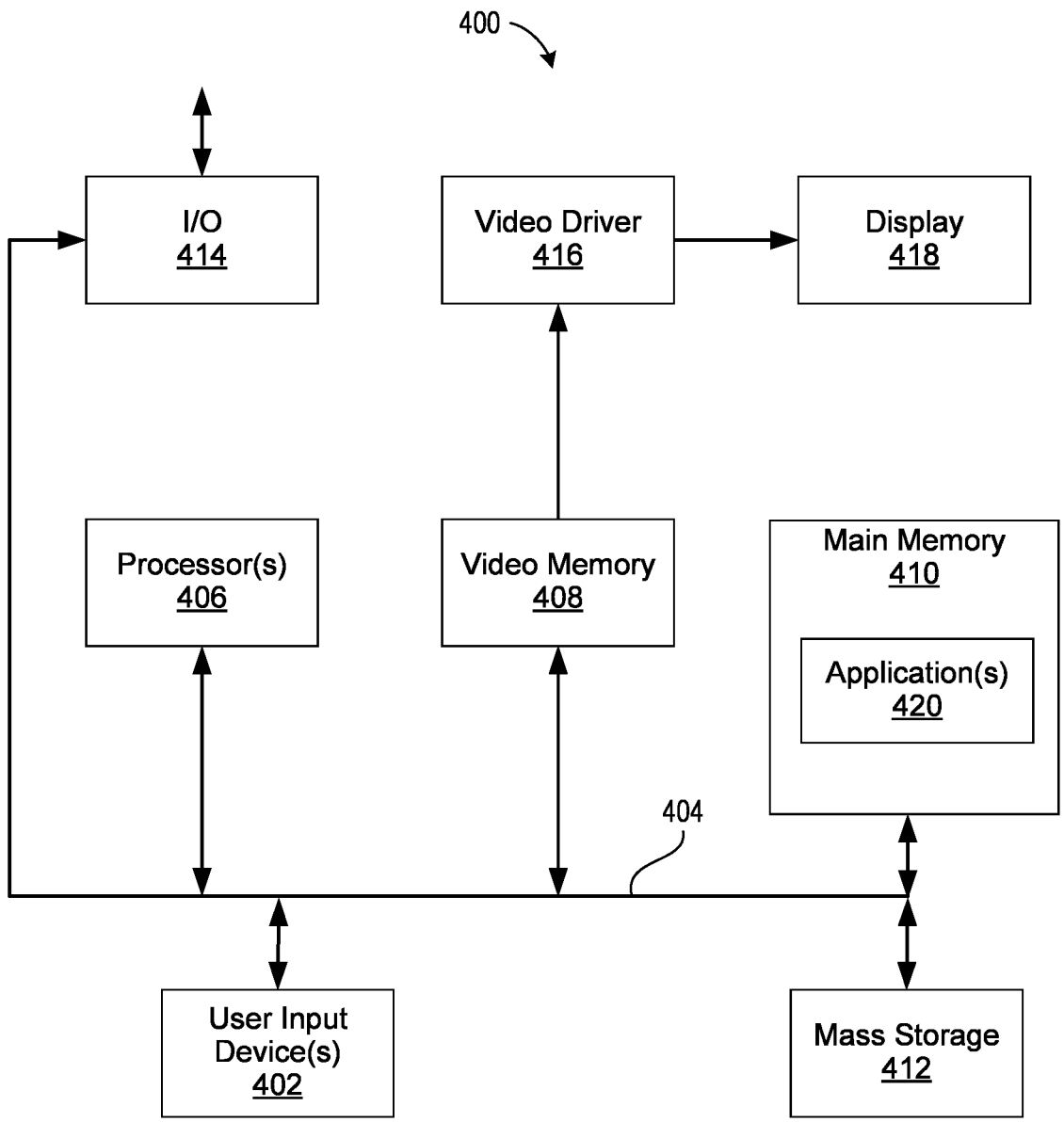
FIG. 4 depicts an example specialized computer system in which at least some embodiments of the methods and systems that are disclosed may be practiced.

FIG. 4 depicts an example specialized computer system that can represent at a hardware level servers 304(1)-(N) and clients 306(1)-(N). At least some of the embodiments of the below described systems and methods can be implemented on a specially programmed computer system such as computer 400 illustrated in FIG. 4. The computer 400 can be a dedicated computer system or a virtual, emulated system located in, for example, a cloud computing environment. User input device(s) 402, such as a keyboard and/or mouse, are coupled to a bi-directional system bus 404. The user input device(s) 402 are for introducing user input to the computer system and communicating that user input to the processor(s) 406. The computer system of FIG. 2 generally also includes a non-transitory video memory 408, non-transitory main memory 410, and non-transitory mass storage 412 all coupled to bi-directional system bus 404 along with user input device(s) 402 and processor(s) 406. The mass storage 412 may include both fixed and removable media, such as a hard drive, one or more CDs or DVDs, solid state memory including flash memory, and other available mass storage technology. Bus 404 may contain, for example, 32 of 64 address lines for addressing video memory 408 or main memory 410. The system bus 404 also includes, for example, an n-bit data bus for transferring DATA between and among the components, such as processor(s) 406, main memory 410, video memory 408 and mass storage 412, where "n" is, for example, 32 or 64. Alternatively, multiplex data/address lines may be used instead of separate data and address lines.

I/O device(s) 414 may provide connections to peripheral devices, such as a printer, and may also provide a direct connection to a remote server computer systems via a telephone link or to the Internet via an ISP. I/O device(s) 414 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O device(s) 414 include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a memory, such as mass storage 212, into main memory 210 for execution. Computer programs may also be in the form of electronic signals modulated in accordance with the computer program and data communication technology when transferred via a network.

Processor(s) 406 are any other suitable single or multiple microprocessors or microcomputers may be utilized. Main memory 210 includes dynamic random access memory (DRAM). Video memory 408 may be a dual-ported video random access memory. One port of the video memory 408 is coupled to video driver 416. The video driver 416 is used to drive the display 418. Video driver 416 is well known in the art and may be implemented by any suitable means. This circuitry converts pixel DATA stored in video memory 408 to a raster signal suitable for use by display 418. Display 418 is a type of monitor suitable for displaying graphic images.

Furthermore, main memory 410 may include application(s) 420 that can perform the methods described herein.

The computer system described above is for purposes of example only. It is contemplated that at least some of the embodiments of the below described systems and methods might be run on a stand-alone computer system, such as the one described above. At least some of the embodiments of the below described systems and method might also be run from a server computer systems system that can be accessed by a plurality of client computer systems interconnected over an intranet network. Finally, at least some of the embodiments of the below described systems and method may be run from a server computer system that is accessible to clients over the Internet.

In various embodiments, the main memory 210 includes a fully complex neural network model, teacher model 220. The teacher model 220 is configured to perform various contextual bandit algorithms, as well known in the field. Examples of such contextual bandit algorithms include LinUCB and LinTS. Furthermore, teacher model 220 can implement deep learning and approximate Bayesian algorithms and methods which, when distilled to the student model 222 utilizing the replay buffer 224, can result in greater performance over a variety of data sets. The teacher model 220 is considered a full complex model relative to the less cumbersome, e.g. a sparser data set, student model 222, implementing deep contextual bandit algorithms. Although the teacher model 220 provides very good performance, the teacher model 220 requires relatively greater processing and memory resources, which can result in undesirable latency in providing results.

Embodiments of the disclosure are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

The disclosed system is well adapted to attain the advantages mentioned as well as others inherent therein. While the disclosed system has been depicted, described, and is defined by reference to particular embodiments, such references do not imply a limitation on the scope of the disclosure, and no such limitation is to be inferred. The disclosed system is capable of considerable modification, alteration, and equivalents in form and function, as will occur to those ordinarily skilled in the pertinent arts. The depicted and described embodiments are examples only and are not exhaustive of the scope of the teachings of the present application.

What is claimed is:

1. A computer-implemented method for providing a self-contained certificate signing request (SC CSR), the method comprising:
   determining an entity that requires a certificate, wherein the certificate identifies the entity to other entities;
   binding an identity of a requestor to the SC CSR;
   sending the SC CSR that is bound with the identity to one or more intermediaries which is passed along to a certificate authority (CA), wherein the CA performs a validation on the SC CSR that is bound with the identity to verify the identity and an authorization to receive certificates by the requestor; and receiving the certificate from the CA.

2. The computer-implemented method of claim 1, wherein the requestor requests a certificate for itself or a deployed service.

3. The computer-implemented method of claim 1, wherein the binding the identity comprises providing with the SC CSR with a public key 2 (PuK_2) signed by private key (PrK_1) and a public certificate (PC_1).

4. The computer-implemented method of claim 3, wherein the public certificate (PC_1) is replaced with a JSON Web Token (JWT) when JWT is implemented for authentication and authorization.

5. The computer-implemented method of claim 1, wherein the requestor establishes a transport layer security (TLS) connection with the one or more intermediaries using a private key (PrK_1) and a public certificate (PC_1) pair (PrK_1, PC_1), wherein the (PrK_1, PC_1) is used by the one or more intermediaries for authentication and authorization.

6. The computer-implemented method of claim 1, wherein validation performed at the CA is performed by a component that validates an integrity of the SC CSR and uses a public certificate (PC_1) to verify a signature of a public key 2 (PuK_2) signed by private key (PrK_1).

7. The computer-implemented method of claim 1, wherein the one or more intermediaries and CA communicate with an identity access management (IAM) service.

8. A system comprising:
a processor; and
a non-transitory, computer-readable storage medium having code stored therein and executable by the processor to perform operations comprising:
determining an entity that requires a certificate, wherein the certificate identifies the entity to other entities;
binding an identity of a requestor to the SC CSR;
sending the SC CSR that is bound with the identity to one or more intermediaries which is passed along to a certificate authority (CA), wherein the CA performs a validation on the SC CSR that is bound with the identity to verify the identity and an authorization to receive certificates by the requestor; and
receiving the certificate from the CA.

9. The system of claim 8, wherein the requestor requests a certificate for itself or a deployed service.

10. The system of claim 8, wherein the binding the identity comprises providing with the SC CSR with a public key 2 (PuK_2) signed by private key (PrK_1) and a public certificate (PC_1).

11. The system of claim 10, wherein the public certificate (PC_1) is replaced with a JSON Web Token (JWT) when JWT is implemented for authentication and authorization.

12. The system of claim 8, wherein the requestor establishes a transport layer security (TLS) connection with the one or more intermediaries using a private key (PrK_1) and a public certificate (PC_1) pair (PrK_1, PC_1), wherein the (PrK_1, PC_1) is used by the one or more intermediaries for authentication and authorization.

13. The system of claim 8, wherein validation performed at the CA is performed by a component that validates the integrity of the SC CSR and uses a public certificate (PC_1) to verify a signature of a public key 2 (PuK_2) signed by private key (PrK_1).

14. The system of claim 8, wherein the one or more intermediaries and CA communicate with an identity access management (IAM) service.

15. A non-transitory, computer-readable storage medium embodying computer program code, the computer program code comprising computer executable instructions that when executed by a processor perform operations comprising:
determining an entity that requires a certificate, wherein the certificate identifies the entity to other entities;
binding an identity of a requestor to the SC CSR;
sending the SC CSR that is bound with the identity to one or more intermediaries which is passed along to a certificate authority (CA), wherein the CA performs a validation on the SC CSR that is bound with the identity to verify the identity and an authorization to receive certificates by the requestor; and
receiving the certificate from the CA.

16. The non-transitory, computer-readable storage medium of claim 15, wherein the requestor requests a certificate for itself or a deployed service.

17. The non-transitory, computer-readable storage medium of claim 15 wherein the binding the identity comprises providing with the SC CSR with a public key 2 (PuK_2) signed by private key (PrK_1) and a public certificate (PC_1).

18. The non-transitory, computer-readable storage medium of claim 17, wherein the public certificate (PC_1) is replaced with a JSON Web Token (JWT) when JWT is implemented for authentication and authorization.

19. The non-transitory, computer-readable storage medium of claim 15, wherein the requestor establishes a transport layer security (TLS) connection with the one or more intermediaries using a private key (PrK_1) and a public certificate (PC_1) pair (PrK_1, PC_1), wherein the (PrK_1, PC_1) is used by the one or more intermediaries for authentication and authorization.

20. The non-transitory, computer-readable storage medium of claim 15, wherein validation performed at the CA is performed by a component that validates an integrity of the SC CSR and uses a public certificate (PC_1) to verify a signature of a public key 2 (PuK_2) signed by private key (PrK_1).

* * * * *